US009459129B2

(12) United States Patent
Bellala et al.

(10) Patent No.: US 9,459,129 B2
(45) Date of Patent: Oct. 4, 2016

(54) DETERMINING SENSOR PLACEMENT IN DISTRIBUTED NETWORKS

(75) Inventors: Gowtham Bellala, Mountain View, CA (US); Manish Marwah, Palo Alto, CA (US); Martin Arlitt, Calgary (CA); Geoff M. Lyon, Half Moon Bay, CA (US); Cullen E. Bash, Los Gatos, CA (US); Chandrakant Patel, Fremont, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 998 days.

(21) Appl. No.: 13/528,590

(22) Filed: Jun. 20, 2012

(65) Prior Publication Data
US 2013/0345993 A1 Dec. 26, 2013

(51) Int. Cl.
*G01F 15/06* (2006.01)

(52) U.S. Cl.
CPC .................... *G01F 15/063* (2013.01)

(58) Field of Classification Search
CPC ........................................... G01F 15/063
USPC ........................................................ 702/45
See application file for complete search history.

(56) References Cited

U.S. PATENT DOCUMENTS

| 7,395,195 | B2 | 7/2008 | Suenbuel et al. | |
|---|---|---|---|---|
| 7,668,671 | B1 * | 2/2010 | Gristina | 702/61 |
| 7,822,564 | B2 | 10/2010 | Davis et al. | |
| 2012/0201179 | A1 * | 8/2012 | Das et al. | 370/311 |
| 2013/0107761 | A1 * | 5/2013 | Das et al. | 370/256 |
| 2013/0151177 | A1 * | 6/2013 | Hughes | 702/60 |

FOREIGN PATENT DOCUMENTS

| KR | 20080076551 A | 8/2008 |
|---|---|---|
| WO | WO-2011130670 A2 | 10/2011 |

OTHER PUBLICATIONS

Ghasemzadeh, H. et al.; "Action Coverage Formulation for Power Optimization in Body Sensor Networks"; Mar. 21-24, 2008; pp. 446-451.
Mutlu, B. et al.; 2007; Robust, Low-cost, Non-intrusive Sensing and Recognition of Seated Postures; pp. 149-158; http://goodgestreet.com/docs/Mutlu_UIST07.pdf.
Wang, X. et al.; "Towards Optimal Sensor Placement for Hot Server Detection in Data Centers"; Jun. 20-24, 2011; pp. 899-908.

* cited by examiner

*Primary Examiner* — Bryan Bui
(74) *Attorney, Agent, or Firm* — Hewlett Packard Enterprise Patent Department

(57) ABSTRACT

Determining sensor placement in distributed networks includes identifying measurement locations in a distributed network with a tree topology and selecting a subset of the measurement locations for sensor placement with a mutual information function.

20 Claims, 6 Drawing Sheets

DETERMINING SENSOR PLACEMENT IN DISTRIBUTED NETWORKS

BACKGROUND

Modern buildings are equipped with power distribution networks to supply power to appliances operated within the building and to run the building's auxiliary systems. For example, computers, air conditioners, heaters, lighting, other auxiliary systems, and other appliances utilize electricity provided from the power distribution networks.

The power distribution network usually connects to a community power grid at an electrical panel of the building. At the panel, the electricity is divided into multiple electrical circuits. Some of the electrical circuits take power to subpanels that further divide the electricity to even more electrical circuits. The building may have multiple layers of panels to divide and direct the power to the appropriate electrical loads in the building. The electrical circuits connected to panels at the end of the distribution network connect directly to specific electrical loads, such as an electrically consuming appliance, like a computer, or to an auxiliary system, such as a lighting system or a climate control system.

BRIEF DESCRIPTION OF THE DRAWINGS

The accompanying drawings illustrate various examples of the principles described herein and are a part of the specification. The illustrated examples are merely examples and do not limit the scope of the claims.

DETAILED DESCRIPTION

Figure 1:
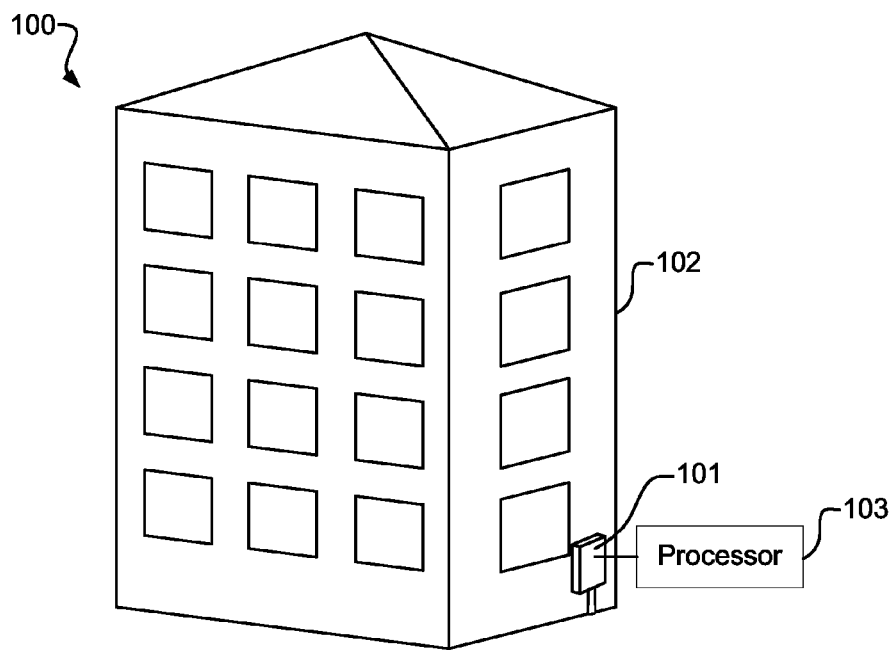
FIG. 1 is a diagram of an illustrative structure, according to principles described herein.

Resource consumption sensors, such as electrical meters, water meters, gas meters, waste meters, other meters, or combinations thereof may be used in buildings to minimize resources consumed within the buildings. Electrical meters, for example, may be attached at each electrical panel to monitor the amount of electricity consumed. However, especially for larger buildings, placing sensors at every panel may be very expensive.

The present specification describes subject matter including, for example, a method for determining sensor placement in distributed networks. Examples of such a method include identifying measurement locations in a distributed network with a tree topology and selecting a subset of the measurement locations for sensor placement with a mutual information function.

A measurement location may be a location within the distributed network where a sensor may be installed such that the sensor may determine the amount of resources consumed at that location, resources consumed downstream of that location, resources consumed upstream of that location, or combinations thereof. When a network is organized with a tree topology some of the measurement locations may be referred to as leaf locations because they are located at the end of the distribution network and measure a single load, such as a resource consuming appliance and/or system, or a set of loads. Other measurement locations may be referred to as branch locations that receive input from multiple leaf locations. The measurement obtained at a branch location reflects the input from multiple loads.

While sensors may be placed at each of the leaf locations for fine grained monitoring of resource consumption, this may be expensive. In some examples, some sensors may be placed at branch locations upstream, or a combination of branch and leaf locations, such that the chosen set of locations reveals maximum information about resource consumption at all the leaf locations.

The benefit of sensor placement at a subset of locations in terms of the amount of information they reveal about resource consumption at the leaf locations, is measured using the mutual information function. Mutual information is defined between two sets of variables, $X_L$ and $X_A$. The first set of variables ($X_L$) corresponds to resource consumption at all the leaf locations in the tree topology. The next set of variables ($X_A$) corresponds to resource consumption at a subset of measurement locations, where this subset may include both branch and leaf locations. Mutual information may be expressed as:

$$I(X_L;X_A)=H(X_L)-H(X_L|X_A)$$

where $H(X_L)$ is the entropy associated with $X_L$ and is a measure of the uncertainty in resource consumption at the leaf locations, $H(X_L|X_A)$ is the conditional entropy of $X_L$ (conditioned on $X_A$) and is a measure of the uncertainty in resource consumption at the leaf locations given the resource consumption information $X_A$ at the subset of measurement locations, and the mutual information function $I(X_L;X_A)$ represents the resource consumption of the leaf locations that is captured by the resource consumption information at the subset of measurement locations.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described is included in at least that one example, but not necessarily in other examples.

FIG. 1 is a diagram of an illustrative structure (100), according to principles described herein. In this example, the structure (100) is a commercial building with an electrical panel (101) connected on a side (102) of the building (100). An electric grid or power line (not shown) may provide power to the building (100) at the panel (101). The panel (101) may be connected to multiple electrical circuits of a distributed network that distributes the power to various places within the building (100) to provide power to the building's systems and appliances.

In the example of FIG. 1, the panel (101) is in communication with a processor (103) that is part of a monitoring system in the building (101). The monitoring system may periodically identify measurement locations within the distributed network, select a subset of the measurement locations, and recommend the selected set of measurement locations for sensor placement. The monitoring system may recommend where to place sensors within the distributed network to maximize the sensors' ability to gather useful resource consumption information throughout the distributed network. In some examples, the sensors are expensive and placing a sensor at every measurement location may be cost prohibitive. Thus, the monitoring system may make cost effective recommendations for installing sensors in the structure (100).

The location of the panel (101) may be a measurement location to monitor the amount of electrical energy consumed by electrical circuits in communication with the panel (101). Thus, the processor (103) may identify the panel's location and assign an informative value to panel's location. In some examples, the processor (103) may select the panel's location to be part of a subset of measurement locations that the processor (103) recommends to have a sensor.

The informative value may be a value assigned at each measurement location that gives the processor (103) information to compare each of the measurement locations to one another. For example, the informative value may be an unpredictability value, a variability consumption value, a total resource consumption value, a number of loads in communication with the measurement location, a number of connections to measurement locations providing incoming information, other values, or combinations thereof. In the example of FIG. 1, the informative value is an unpredictability value that allows the processor (103) to rank all of the measurement locations based on how unpredictable the measurement of resource consumption is at that location. For example, a first location that is electrically connected to a first lighting system that is consistently turned on during just working hours may measure a more predictable amount of electricity consumption than a second location that is electrically connected to a second lighting system equipped with motion detectors. The second lighting system may turn off during working hours when no one appears to be within the rooms controlled with that lighting system or when there is sufficient sunlight entering the room to enable the second lighting system to be dimmed or turned off. Consequently, the second location may have a greater unpredictability value.

While the example of FIG. 1 has been described with an electrical supply network, the distributed network may be a water supply network, a gas supply network, a waste disposal network, other supply network, or combinations thereof. Further, while the distribution network in the example in FIG. 1 is incorporated into a building, other structures may incorporate distribution networks in accordance with the principles described herein. For example, the structure may be a pipeline, machine, vehicle, cruise ship, space ship, automobile, boat, air plane, other structures, or combinations thereof. In some examples, the principles described herein are applied to distribution networks in communities, like university campuses, business campuses, government facilities, neighborhoods, towns, cities, municipalities, real estate developments, real estate subdivisions, other types of communities, or combinations thereof.

Figure 2:
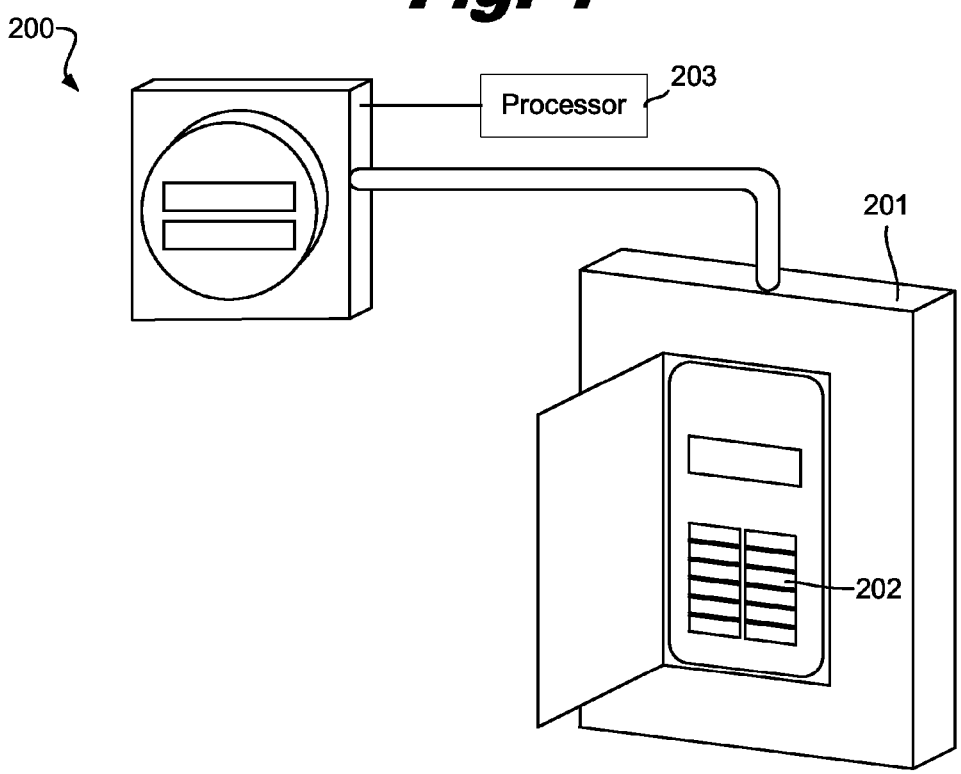
FIG. 2 is a diagram of an illustrative sensor, according to principles described herein.

FIG. 2 is a diagram of an illustrative sensor (200), according to principles described herein. In this example, the sensor (200) is an electrical meter that is in communication with an electrical panel (201). The sensor (200) may measure the amount of electricity used by the circuits in communication with the panel (201). In some examples, at least one of the circuits connected to the panel is directly connected to an appliance and/or a system in the structure. In some examples, at least one of the circuits is connected to another panel that distributes the electrical power into more circuits.

The sensor (200) may measure the amount of electricity used in kilowatt hours or other suitable measurement units. The sensor may measure all of the electrical energy consumed by all of the circuits connected to the panel. In some examples, the sensor (200) is connected to just a portion of the circuits connected to the panel.

In some examples, the panel (201) has at least one circuit breaker switch (202) that breaks one of the circuits connected to the panel (201) when tripped. A circuit breaker switch (202) may be self tripped when its associated circuit is electrically overloaded. Further, the circuit breaker switch (202) may be manually tripped by a user. The user may manually trip the circuit breaker switch (202) when performing repairs on the circuits or the systems and/or appliances connected to the circuit. In some examples, a non-exhaustive list of appliances includes computers, chillers, compressors, heaters, refrigerators, fans, lights, printers, water heaters, swamp coolers, other appliances, or combinations thereof. In some examples, a non-exhaustive list of systems include lighting systems, climate control systems, refrigeration systems, security systems, network systems, other systems, or combinations thereof.

In the example of FIG. 2, a processor (203) is in communication with the sensor. The processor (203) may be part of a monitoring system that takes input from the sensor (200) and directs that input to a centralized repository for processing. The monitoring system may use the centralized data to periodically reevaluate sensor placement within the structure's distribution network.

Figure 3:
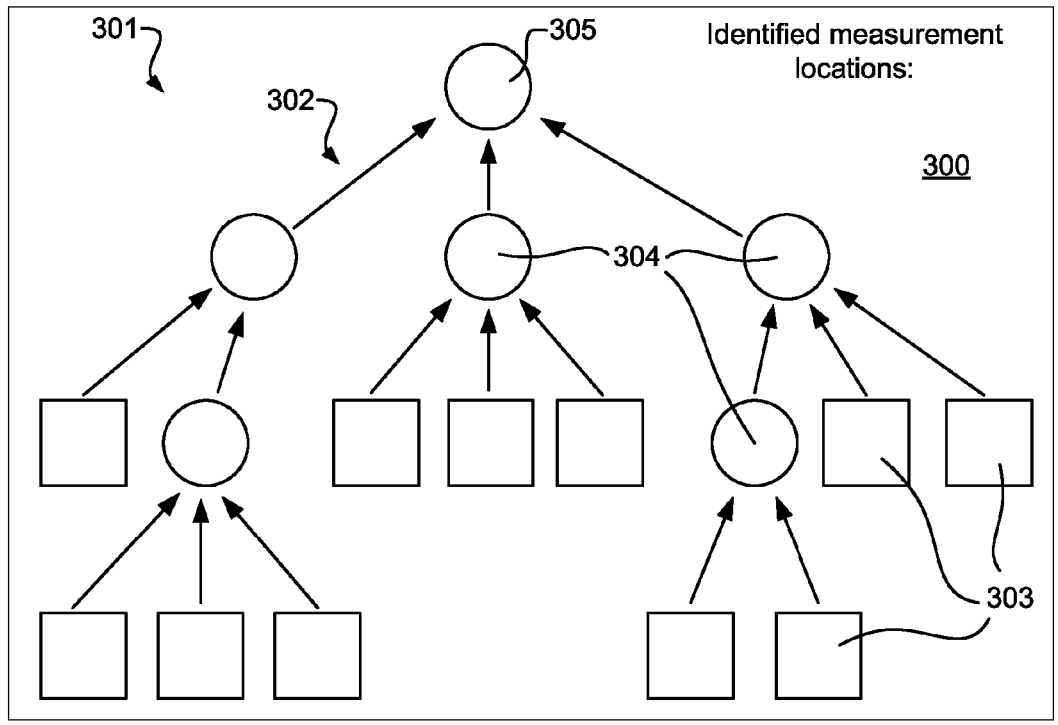
FIG. 3 is a diagram of an illustrative display of a distribution network, according to principles described herein.

FIG. 3 is a diagram of an illustrative display (300) of a distribution network (301), according to principles described herein. The display (300) may be part of a user interface that is in communication with a program that identifies the measurement locations. In some examples, the measurement locations are identified through user input.

In this example, the distribution network (301) has a tree topology (302) where the distribution network has multiple leaf locations (303), which are denoted with a square shape. The leaf locations may be directly connected to a single load, such as an appliance or a system in the structure, or a set of loads. Branch locations (304), which are denoted with a circular shape, are fed information from leaf locations (303) or other branch locations (304). The branch locations (304) feed the information upstream to a central location (305). The central location (305) may also be a centralized panel that connects the distribution network (301) to an electrical grid and distributes the power downstream to the branch locations (304) and the leaf locations (303). In some examples, the information may be stored at decentralized locations within the distribution network (301). Decentralized storage may be useful for large distribution networks.

Sensors, such as power meters, may be installed at selected measurement locations for fine-grain power consumption measurements. A program may be used to determine which measurement locations reveal the most information about power consumption at the leaf locations (303). For example, placing a sensor at a branch location that receives input from multiple leaf locations may provide information about these leaf locations collectively. A sensor placed on one of the leaf locations may provide information about energy consumption of the single load or set of loads, connected to just that leaf location. The program may determine which combination of measurement locations provides the greatest amount of useful information.

In some examples, the program determines an informative value of each measurement location. The informative value may be an unpredictability value, which may be a measurement of how unpredictable the energy consumption is for any particular measurement location. Given the informative value, the program may select a subset of the measurement locations to recommend for sensor placement.

The program may select the subset of the measurement locations using the mutual information function that includes selecting the measurement locations sequentially. The program may select a next measurement location for the subset out of the remaining measurement locations by choosing the measurement location with the next highest informative value. In some examples, the program maximizes the mutual information function in a greedy fashion where a highest value is chosen from the group of measurement locations outside of the subset regardless of whether such a selection will finally yield the highest global value to the subset. For example, some of the information that contributes to an informative value may be repeated in different locations, and as a consequence, the repeated information raises the informative values for each of these locations. However, the measurement locations with repeated information may be selected at the expense of selecting measurement locations with unique information. The unique information may increase the overall amount of information that may be gathered with the subset while the repeated information may contribute minimally to the overall amount of information.

In some examples, the program may select the next measurement location for sensor placement in a sequential fashion using the following function:

$$j^* = \underset{j \notin A}{\mathrm{argmax}}\, I(X_L; X_{A \cup j}) - I(X_L; X_A),$$

where j represents the next measurement location to be selected for the subset, A represents the subset of selected measurement locations, L represents leaf locations directly connected to resource consuming appliances, $I(X_L;X_A)$ represents an amount of information conveyed about the leaf locations when monitoring measurement locations within the subset, and $I(X_L;X_{A \cup j})$ represents an amount of information conveyed about the resource consuming appliances when monitoring the measurement locations in the subset and the next measurement location (j) to be selected for inclusion in the subset.

In some examples, the set of measurement locations selected using the above mentioned sequential approach may result in the maximum amount of information possible with the number of sensors available for the network. In other examples, the selected set of measurement locations may provide just a near-maximum amount of information with the number of sensors available for the network. However, a near optimal selection of measurement locations may be beneficial, as obtaining an optimal selection of measurement locations that provide the maximum amount of information for the available number of sensors, is a complicated task requiring a large amount of computing resources and time. In some examples, obtaining the optimal selection of measurement locations may be computationally impractical. For example, some networks may have a large enough number of measurement locations that obtaining the maximum amount of information may take years to compute. Additionally, the difference between the amount of information provided by the optimal selection of measurement locations, and the set of measurement locations selected using the above sequential approach may be small. It is thus cost effective to determine the sensor placement recommendation using a simple, sequential approach that is less expensive to execute.

The set of measurement locations selected in the above mentioned sequential fashion results in greedy maximization of the mutual information function, where the obtained set of locations provides resource consumption information that is close to the maximum information that can be obtained using the available number of sensors. The degree of closeness can be effectively quantified using the theory of sub-modularity. Generally, the mutual information function is not sub-modular. However, when the mutual information function is defined between the leaf locations and any subset of locations that may include both leaf and branch locations under a tree topology, the mutual information function becomes sub-modular. The sub-modularity of the mutual information function guarantees that the set of measurement locations selected in a sequential fashion will provide near-maximum information about the resource consumption at the leaf locations using the available number of sensors. More specifically, the relation between the information captured using the selected set of measurement locations and the optimal set of measurement locations using the available number of sensors, can be described as follows, $$I(X_L; X_{Agreedy}) \geq \left(1 - \frac{1}{e}\right) I(X_L; X_{Amax}),$$

where $I(X_L;X_{Agreedy})$ represents the information captured about the resource consumption information at the leaf locations using the set of measurement locations selected sequentially as mentioned above, $I(X_L;X_{Amax})$ represents the maximum amount of information that may be collected about the resource consumption at the leaf locations using the available number of sensors, and e corresponds to the Euler's constant, which is the base of the natural logarithm with an approximate value of 2.71828. In other words, the set of measurement locations selected in the sequential manner capture at least 63.21% of the maximum amount of information that can be collected using the available number of sensors. Thus, greedy maximization of the mutual information function will still result in a near-optimal selection of measurement locations, while requiring a significantly smaller amount of computing resources, time and processing costs.

Figure 4:
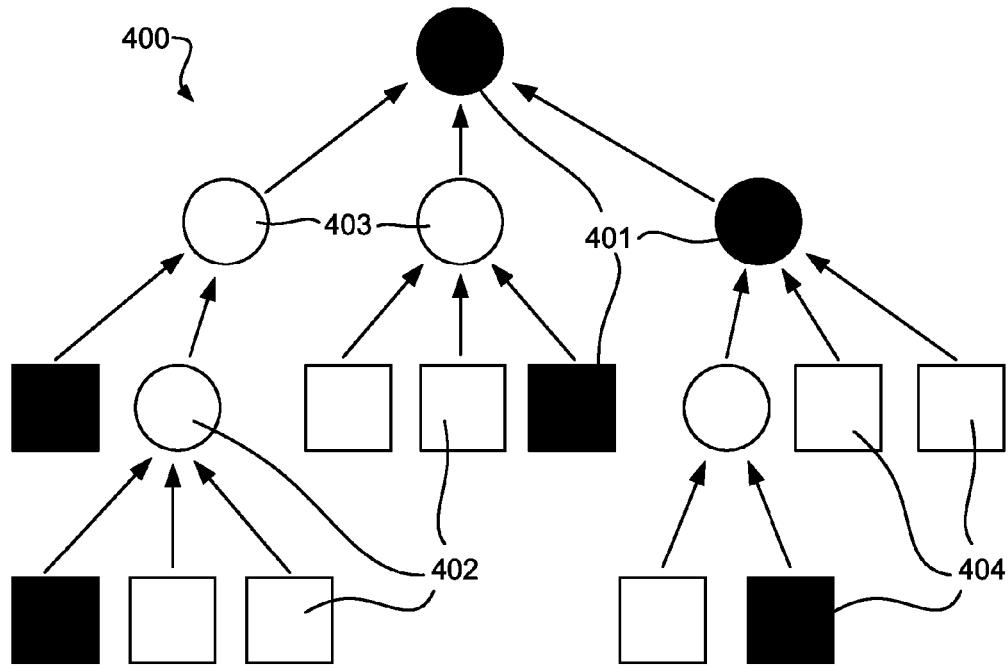
FIG. 4 is a diagram of an illustrative distribution network, according to principles described herein.

FIG. 4 is a diagram of an illustrative distribution network (400), according to principles described herein. In this example, the subset (401) of measurement locations chosen to be recommended for sensor placement is filled in with black while those measurement locations (402) that remain outside of the subset (401) are filled in with white. The program may recommend sensors for those measurement locations included in the subset. In this manner, the resource consumption of the distributed network may be monitored cost effectively while still providing fine-grained information to users about the building's resource consumption.

In the example of FIG. 4, the subset (401) includes both branch locations (403) and leaf locations (404). The sensors attached to the leaf locations (404) that are included in the subset (401) may measure the energy consumed for each of the loads powered by those measurement locations. The sensors attached to the branch locations (403) that are included in the subset (401) may measure the energy consumed collectively for each of the loads powered downstream from that branch location.

In FIG. 4, the inclusion of both leaf and branch locations (403, 404) in the subset (401) indicates that a maximum or near-maximum amount of useful information is provided when some appliances or systems are monitored directly at the leaf locations while other appliances or systems are monitored collectively at the branch locations. The useful information may include the unpredictability in the resource consumption at that particular measurement location. In some examples, predictable measurements are less informative than unpredictable measurements because the predictable measurements may not vary much over time. On the other hand, the appliances or systems with unpredictable resource consumption may be more interesting when trying to determine how to minimize the structure's overall resource consumption. In alternative examples, the predictable loads may be extracted from placing sensors at higher level branch locations.

Figure 5:
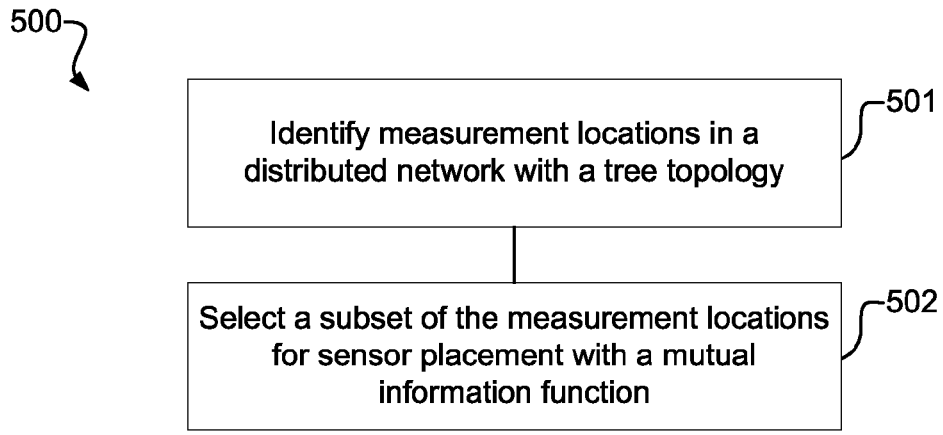
FIG. 5 is a diagram of an illustrative method for determining sensor placement, according to principles described herein.

FIG. 5 is a diagram of an illustrative method (500) for determining sensor placement, according to principles described herein. In this example, the method (500) includes identifying (501) measurement locations in a distributed network with a tree topology and selecting (502) a subset of the measurement locations for sensor placement with a mutual information function.

In some examples, the distributed network is a power supply network, a water supply network, a waste disposal network, a gas supply network, other networks, or combinations thereof. In some examples, the measurement locations measure consumption of water, electricity, waste, gas, other resource, or combinations thereof. In some examples, the distributed network is incorporated into a building, pipeline, community, machine, vehicle, other structure, other setting, or combinations thereof.

In some examples, the method (500) is carried out to equip a structure with resource consumption measurement sensors. For example, the method (500) may be applied to a structure, such as a building, to improve the structure's resource conservation. The potential measurement locations may be inputted into a program or the program may identify the measurement locations through another process. Also, an informative value of each of the measurement locations may be inputted into the program or the program may further determine the informative value through another process. After the measurement locations and their informative values are determined, the program may apply the mutual information function to the data to select a subset of all of the measurement locations for the program to recommend for installing sensors.

The program may select the measurement locations sequentially. Each time the program selects another measurement location, the program may select the measurement location from the group of measurement locations still remaining outside of the subset. In some examples, the number of sensors available to install in the distributed network is equal to or greater than the number of measurement locations in the distributed network. In such an example, the program may select all of the measurement locations to be in the subset and recommend that each have a sensor installed. However, in examples where the number of sensors available for the network is less than the number of measurement locations, the program may select as many measurement locations as there are sensors.

The mutual information function may recommend specific measurement locations such that the measurement location selection reveals the maximum amount of information. However, in some examples, obtaining the maximum amount of information is traded off for simpler processing, and the mutual information function may recommend measurement locations that will yield the near-maximum amount of information, for example from a fixed number of measurement locations. In some examples, the subset of measurement locations to recommend for sensor installment includes both leaf and branch locations.

In some examples, the distribution network includes few or no sensors at the measurement locations prior to the recommendation from the program. After receiving the recommendation, the sensors may be installed into the distribution network as recommended.

In some examples, the program estimates the amount of information that may be collected from the sensors given the number of sensors that the user wishes to install. In some examples, the user runs the program multiple times, inputting a different number of sensors available for installation each time the program is run. As a consequence, the user may determine an optimal or near-optimal sensor placement combined with an optimal or near-optimal number of sensors to be installed. In some examples, the program automatically calculates the return on investment for each sensor that it recommends for installation. In such a manner, the program may give a user a recommendation for the optimal or near-optimal number of sensors to be installed.

In other examples, after the sensors are installed into the structure, input from the sensors is routed to a central repository for processing. The informative value used to determine the initial installation of sensors may be monitored by the program. As the appliances and systems in the structure are used differently over time, the informative value of the measurement locations may change. Further, new appliances or upgraded systems may also change the informative value of the measurement locations that remain outside of the subset. Thus, the program may periodically rerun the method to recommend whether additional sensors should be installed, whether specific sensors should be removed, whether specific sensors should be moved, or combinations thereof. The program may perform the analysis on a periodic basis or as requested.

In some examples, the method is applied to distributed networks that are incorporated into multiple buildings, such as a university campus, a research campus, a business park, real estate development, a town, a municipality, a city, or combinations thereof. The distributed network may include loads from within buildings or outside of buildings. In an example of a power distribution network with electrical loads located outside of buildings, a non-exhaustive list of devices with such electrical loads may include traffic lights, light posts, electric signs, intercom systems, underground heaters to melt snow and ice, outdoor electrical outlets, camper hook-ups, swimming pool motors and heaters, other devices with electrical loads, and combinations thereof.

Figure 6:
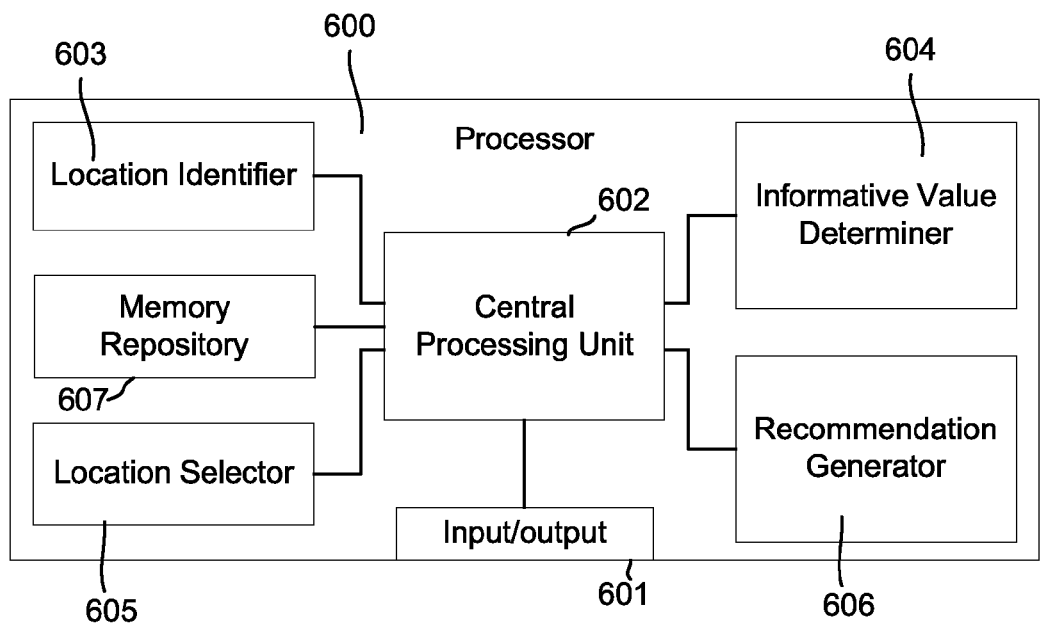
FIG. 6 is a diagram of an illustrative processor, according to principles described herein.

FIG. 6 is a diagram of an illustrative processor (600), according to principles described herein. The processor may be in communication with a tangible storage medium that contains machine read instructions that cause the processor to execute tasks as described herein. In some examples, the memory is location on the processor's chip, located off the processor's chip, location over a network, located at another location, or combinations thereof.

In this example, the processor (600) includes an input/output module (601) in communication with a central processing unit (CPU) (602). The input/output module (601) may be in communication with a user interface where a user can input information about the distributed network. In other examples, the input/output module (601) is in communication with sensors and/or measurement locations.

The CPU (602) may be in communication with a location identifier (603). The location identifier (603) may identify the measurement locations when a user inputs them into a field of a user interface. In some examples, the location identifier (603) may identify from a memory repository (607) the measurement locations that were previously used to run an earlier analysis. In some examples, the memory repository is location off of the processor's chip. In some examples, the location identifier (603) identifies the measurement locations over a network.

An informative value determiner (604) may determine how valuable each of the identified locations is and assign a value to each identified location. In some examples, the informative value is based on a single parameter. In other examples, the informative value is based on multiple parameters. In some examples where multiple parameters are used, each of the different parameters may have a different weighted value to arrive at a collective informative value. In some examples, the informative value is based on just how unpredictable the resource consumption is at the measurement location. In other examples, the unpredictability is a predominate factor among multiple factors.

In some examples, the informative value determiner (604) determines the informative value based on provided data. For example, a user may input information about the energy consumption of various appliances and systems. In other examples, the energy consumption of each of the measurement locations is measured with a temporarily installed sensor for a short period of time adequate to gather some information about the measurement location's resource consumption. These temporary sensors may be reusable for multiple projects and may be less informative than the permanent sensors that the program recommends. In examples where some information has been recorded at some of the measurement locations, the data may be sent electronically to the processor (600).

When the measurement locations are identified and each measurement location has an informative value determined, a location selector (605) may apply a mutual information function to the data to determine which measurement locations to recommend for sensor installation. The location selector (605) may select a subset of the measurement locations. After selecting the measurement locations, a recommendation generator (606) may generate a recommendation based on the request and send the recommendation to a display in a user interface.

Figure 7:
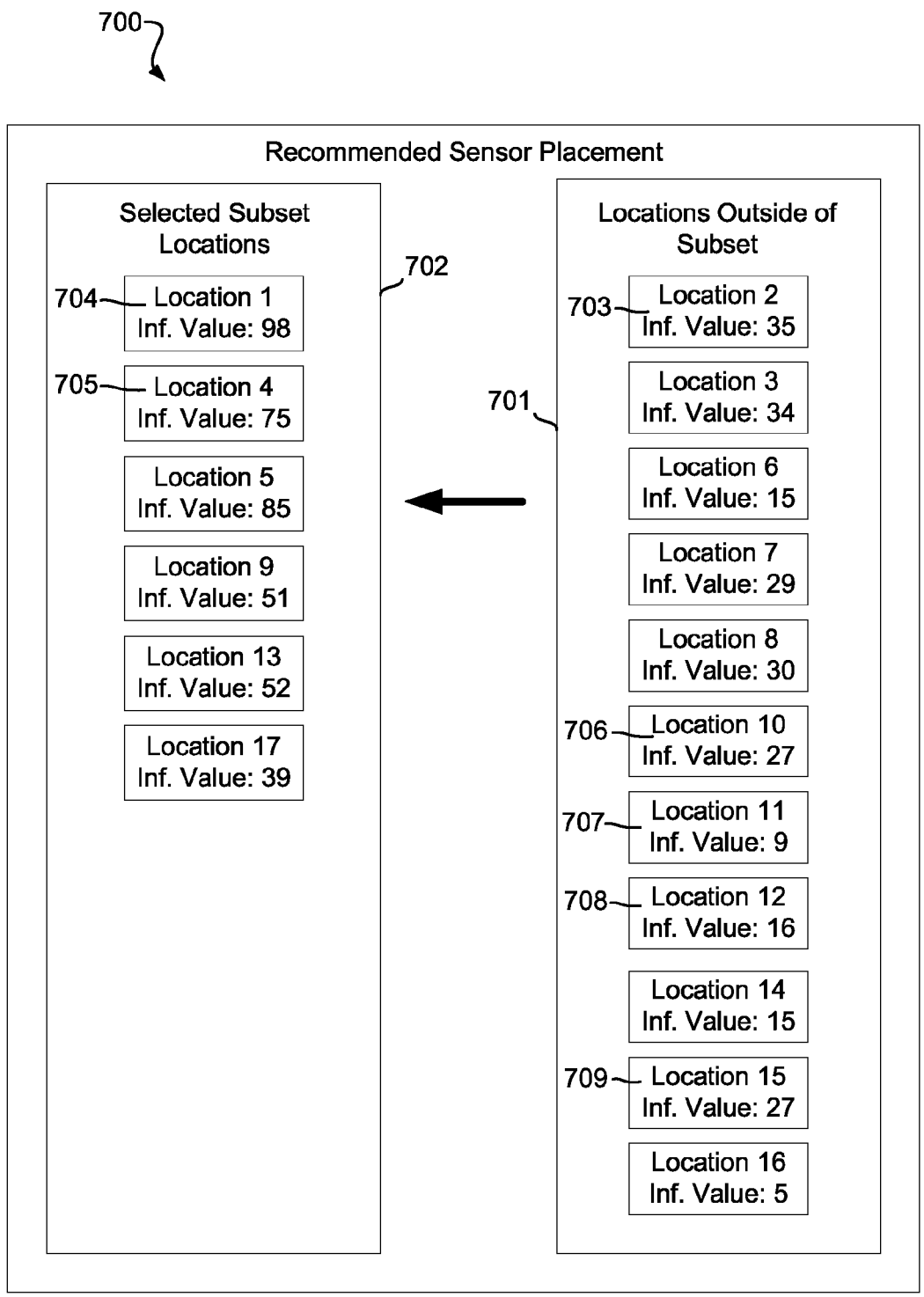
FIG. 7 is a diagram of an illustrative display, according to principles described herein.

FIG. 7 is a diagram of an illustrative display (700), according to principles described herein. In this example, the display (700) is part of a user interface, and the display (700) is giving a user a recommendation to install sensors at the measurement locations included in the subset.

In FIG. 7, each measurement location is assigned an informative value and a subset of the total measurement locations is selected to be recommended for sensor placement. In this example, the measurement locations are moved from a first category (701) of measurement locations outside of the subset into a second category (702) of a selected subset of measurement locations. In this example, the measurement locations with the highest informative values are selected and moved into the subset category (702). As measurement locations are moved from the first category (701) to the second category (702), the informative values of the remaining measurement locations in category (701) are updated.

In examples where the program is continuing to process the information, the program may select the next measurement location to be the measurement location with the next highest informative value. In the example of FIG. 7, location 2 (703) has the next highest value outside of the selected subset of the measurement locations, and as a consequence the program may select location 2 (703) as the next measurement location to be included within the subset. After location 2 (703) is moved to the second category (702), the informative values of the remaining locations in the first category (701) are re-computed in order to take in to account the resource consumption information that is partially revealed with the addition of location 2 (703). For example, the resource consumption information at location 2 (703) and location 10 (706) might be correlated, in which case the informative value of location 10 (706) might reduce from its initial value of 27 by the addition of location 2 (703) in the selected category (702).

In some examples, the locations in the second category (702), which are the selected subset of measurement locations, may contain locations that, if installed with sensors, may yield just a near-maximum amount of information. For example, if sensors were installed at location 1 (704) and location 4 (705), the measurements taken at both location 1 (704) and location 4 (705) may include unpredictability data from location 10 (706), location 11 (707), and location 12 (708). In other words, the information from location 10 (706), location 11 (707), and location 12 (708) are repeated in more than one measurement. At the same time, the subset may overlook information from other measurement locations, such as location 15 (709). The mutual information function applied to select the subset may be simplified to find a near-maximum amount of data about the leaf locations to reduce circuitry and processing time.

Figure 8:
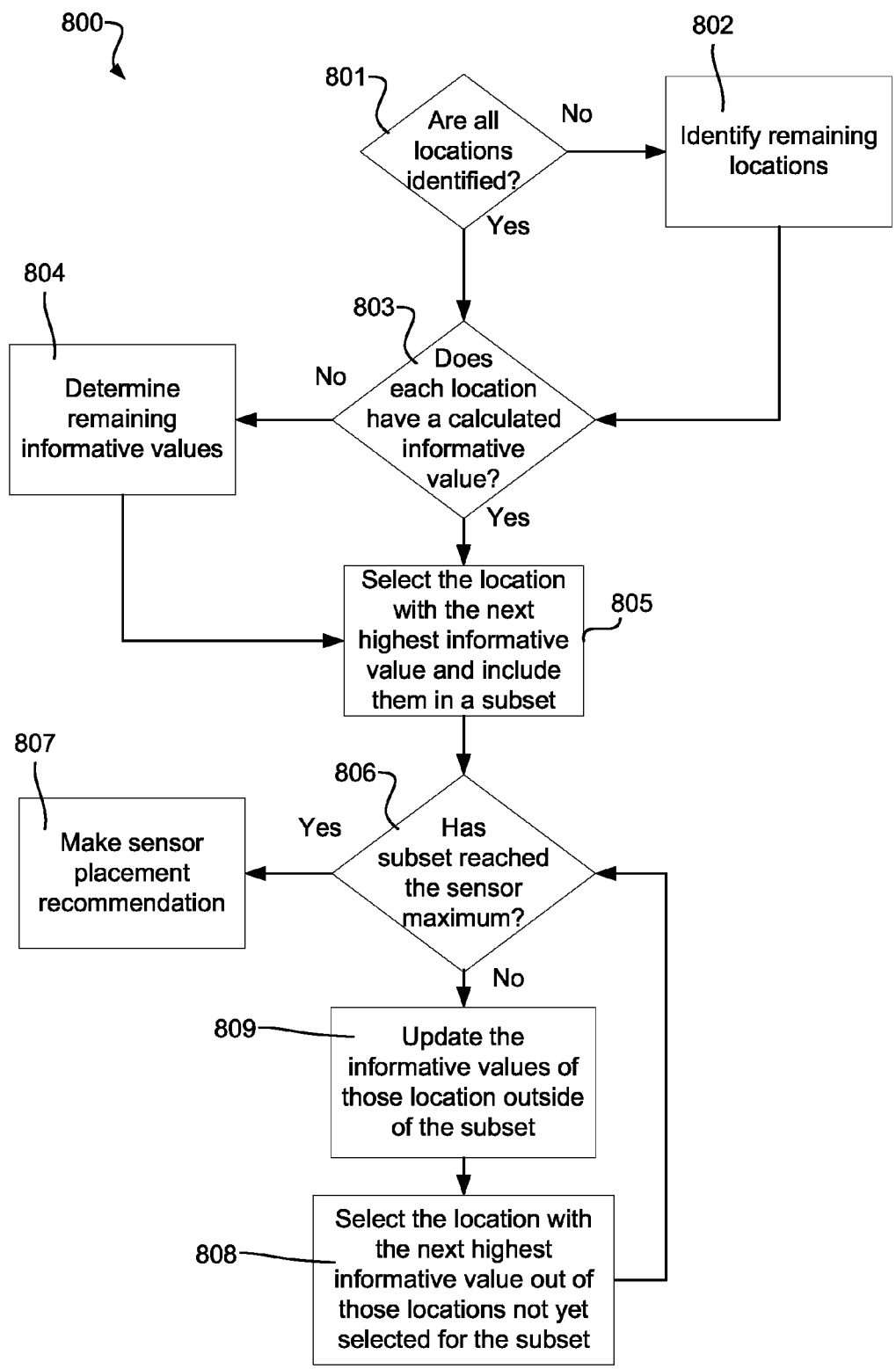
FIG. 8 is a diagram of an illustrative flowchart of a process for determining sensor placement, according to principles described herein.

FIG. 8 is a diagram of an illustrative flowchart (800) of a process for determining sensor placement, according to principles described herein. In this example, the process includes determining (801) whether all of the measurement locations are identified. If they are not yet identified, the process includes identifying (802) the remaining measurement locations. In some examples, the measurement locations are identified when a user inputs the measurement locations into a field of a user interface.

In this example, when the measurement locations are identified, the process includes determining (803) whether each measurement location has a calculated informative value. If some of the measurement locations do not yet have informative values assigned to them, then the process includes determining (804) the informative value for the applicable measurement locations. In some examples, determining (804) may include temporarily installing meters and collecting data for a specified period for time to gather information. This information may be used to compute the informative values.

Next, the process includes selecting (805) the measurement locations with the highest informative values and include these measurement locations in a subset that will be recommended to have sensors installed. The process also includes determining (806) whether the subset has reached the sensor maximum. In some examples, the sensor maximum is determined by the amount of money budgeted for sensors, which may be inputted by a user into a field in a display screen. If the maximum is not yet reached, then the process may include updating (809) the informative values of those locations that remain outside of the subset. After updating the informative values, the process may include selecting (808) the measurement location with the next highest informative value out of those measurement locations not yet selected for the subset. In this example, after selecting another measurement location occurs, the process again determines (806) whether the subset has reached the sensor maximum. If not, the process includes updating (809) the informative values of the remaining locations and selecting (808) another measurement location. This process may continue until the number of measurement locations in the subset equals the maximum number of sensors predetermined for the subset.

After reaching the maximum, the process includes (807) making a sensor placement recommendation. In some examples, the recommendation is made by displaying the recommendation on a display screen. In some examples, the recommendation is sent to at least one email address. In some examples, the recommendation includes an estimated return on investment per sensor placement. In some examples, the recommendation includes more than one recommendation, each recommendation being for a different number of sensors in the selected subset.

Figure 9:
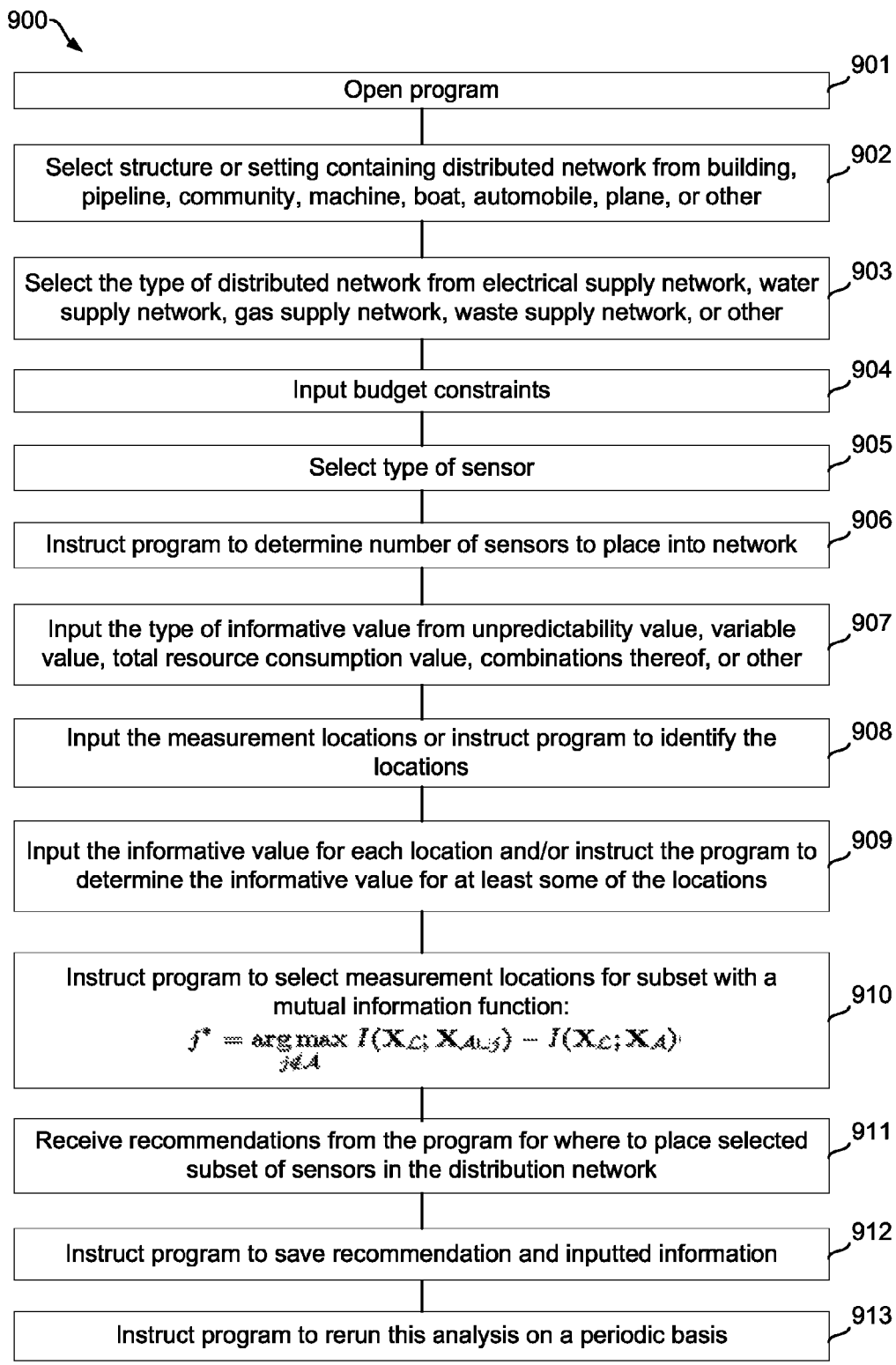
FIG. 9 is a diagram of an illustrative method for determining sensor placement, according to principles described herein.

FIG. 9 is a diagram of an illustrative method (900) for determining sensor placement, according to principles described herein. In this example, the method (900) includes opening (901) a program to execute portions of the method (900). The user may be prompted to select (902) a structure or setting that incorporates a distributed network. In some examples, the structure or settings options includes the following non-exhaustive list of options including buildings, pipelines, communities, machines, boats, automobiles, planes, other structures, other settings, or combinations thereof. The user may also be prompted to select (903) a type of distributed network. In some examples, the options include the following non-exhaustive list of options including electrical supply networks, water supply networks, gas supply networks, waste disposal networks, other networks, or combinations thereof.

The user may also be prompted to input (904) budget constraints and to select (905) a type of sensor to be installed in the network. The user may instruct (906) the program to determine the number of sensors to place in the network given the budget constraints and the selected sensor type.

In this example, the user inputs (907) the type of informative value to be used to determine where to place the selected sensors. In this example, the types of informative values may be selected from the non-exhaustive list of unpredictability values, resource consumption variability values, total resource consumption values, number of loads in communication with the measurement location, number of measurement locations providing incoming information, other values, or combinations thereof.

The user may input (908) the measurement locations or instruct the program to identify the measurement locations. In this example, the user also inputs (909) the informative value for each of the identified measurement locations and/or instructs the program to determine the informative value for at least some of the measurement locations. In some examples, the informative values may be automatically determined by the program. The user may also instruct (910) the program to select measurement locations for the subset with a mutual information function once the informative values and other parameters are determined. In some examples, the next best measurement location is chosen using the gain in mutual information function as shown below, $$j^* = \underset{j \notin A}{\operatorname{argmax}} I(X_L; X_{A \cup j}) - I(X_L; X_A),$$

where j represents the next measurement location to be selected for the subset, where A represents the subset of measurement locations that have already been selected, L represents measurement locations directly connected to resource consuming appliances, $I(X_L;X_A)$ represents an amount of information conveyed about the resource consuming appliances when monitoring measurement locations within the subset, and $I(X_L;X_{A \cup j})$ represents an amount of information conveyed about the resource consuming appliances when monitoring the measurement locations in the subset and the next measurement location to be selected for inclusion in the subset.

The program may determine where the sensors should be placed based on the budget constraints, the sensor type, and the informative values. The user may receive (911) the recommendations from the program for where to place the selected subset of sensors in the distributed network. The user may view the recommendation in a display screen in communication with the program. In this example, the user instructs (912) the program to save the recommendation and the inputted information. Further, this example includes the user instructing (913) the program to rerun this analysis on a periodic basis.

In some examples, the measurement locations with the sensors installed may be monitored over time to determine when it may be appropriate to rerun the analysis. For example, if the raw output of the sensors or a computed value; such as mean, variance, entropy, correlation, or other value; may change significantly over time to determine when to rerun the analysis.

While the specific structures and distributed networks have been described in connection with the specific examples above, any structure, setting, or distributed network may incorporate the method and processes of the principles described herein. Further, while specific sensors have been described in relation to the specific examples above, any type of sensor may be used in accordance to the principles described herein.

While specific informative values and methods for determining informative values have been described in relation to the specific examples above, any informative value or methods for determining informative values may be used in accordance with the principles described herein. Further, while specific mutual information functions have been described in connection with the specific examples above, any mutual information function may be used in accordance with the principles described herein.

While specific mechanisms for making a recommendation on where to place and/or install sensors into the distributed network have been described in relation to the specific examples above, any mechanism for communicating a recommendation may be used in accordance with the principles described herein. Further, the methods and processes for determining where to place and/or install sensors may be used to initially determine where to put the sensors or the method may be used to monitor the placement of sensors that are already installed.

In some examples, the methods and processes described above are performed on existing distributed networks. In other examples, the methods and processes described above are performed in new constructions where the structure or settings are being developed. In some examples, the program for executing the methods and processes described above are in communication with a modeling program that models the distributed network. In such an example, the program may make recommendations on where to place sensors in modeled distributed network.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for determining sensor placement in distributed networks, comprising:
   identifying measurement locations in a distributed network with a tree topology;
   installing at least one sensor in at least one measurement location to obtain input from the corresponding at least one measurement location;
   receiving, by a processor that is part of a monitoring system, input from the at least one sensor corresponding to measurement locations for processing;
   removing the at least one sensor from the corresponding at least one measurement location, and
   selecting, by the processor based on processing the input, a subset of said measurement locations for sensor placement with a mutual information function.

2. The method of claim 1, wherein selecting a subset of said measurement locations for sensor placement with a mutual information function comprises selecting said measurement locations for said subset such that said subset provides a near-maximum amount of information.

3. The method of claim 1, wherein said sensors comprise water consumption meters, electricity consumption meters, waste consumption meters, gas consumption meters, resource consumption meters, or combinations thereof.

4. The method of claim 1, wherein selecting a subset of said measurement locations for sensor placement with a mutual information function comprises selecting said measurement locations sequentially where said mutual information function selects a next measurement location for said subset out of said measurement locations that has a next most highest informative value.

5. The method of claim 4, wherein said next most highest informative value comprises an unpredictability value, a variability consumption value, a total resource consumption value, a number of loads in communication with said next measurement location, a number of other measurement locations providing incoming information, or combinations thereof.

6. The method of claim 4, further comprising updating said informative values of said measurement locations remaining outside of said subset after selecting said next measurement location.

7. The method of claim 1, wherein selecting a subset of said measurement locations for sensor placement with a mutual information function comprises selecting said next measurement location with $$j^* = \underset{j \notin A}{\mathrm{argmax}} I(X_L; X_{A \cup j}) - I(X_L; X_A),$$

where j represents a next measurement location to be selected for said subset, where A represents said subset of said measurement locations, L represents said measurement locations directly connected to resource consuming appliances, $I(X_L; X_A)$ represents an amount of information conveyed about said resource consuming appliances when monitoring said measurement locations within said subset, and $I(X_L; X_{A \cup j})$ represents an amount of information conveyed about said resource consuming appliances when monitoring said measurement locations in said subset and said next measurement location.

8. The method of claim 1, wherein said distributed network is incorporated into a building, pipeline, community, machine, vehicle, or combinations thereof.

9. The method of claim 1, wherein said measurement locations are electrical panels incorporated in a building and said distributed network is an electrical distribution network of said building.

10. The method of claim 1, wherein said sensor determines an amount of resources consumed at a measurement location.

11. The method of claim 1, wherein said subset of said measurement locations comprises bath branch locations and leaf locations.

12. The method of claim 1, wherein selecting a subset of said measurement locations for sensor placement with a mutual information function balances the obtaining of maximum amount of information and more simplified processing.

13. A computer program product for determining sensor placement in distributed networks, comprising:
   a tangible computer readable storage medium, said computer readable storage medium comprising computer readable program code embodied therewith, said computer readable program code comprising:
   computer readable program code to identify measurement locations in a distributed network with a tree topology;
   computer readable program code to obtain, by an input/output module, input from at least one installed sensor corresponding to at least one measurement location, wherein the at least one installed sensor is removed subsequent to obtaining the input;
   computer readable program code to receive, by a processor that is part of a monitoring system, input from the input/output module corresponding to measurement locations;
   computer readable program code to determine, based on processing the input, an informative value for each of said measurement locations; and
   computer readable program code to select a subset of said measurement locations for sensor placement with a mutual information function that selects measurement locations based on said informative value.

14. The computer program product of claim 13, further comprising updating said informative values for said measurement locations remaining outside of said subset.

15. The computer program product of claim 13, further comprising computer readable program code to select a next measurement location for said subset with $$j^* = \underset{j \notin A}{\mathrm{argmax}} I(X_L; X_{A \cup j}) - I(X_L; X_A),$$

where j represents a next measurement location to be selected for said subset, where A represents said subset of said measurement locations, L represents said measurement locations directly connected to resource consuming appliances, $I(X_L:X_A)$ represents an amount of information conveyed about said resource consuming appliances when monitoring said measurement locations within said subset, and $I(X_L:X_{A \cup j})$ represents an amount of information conveyed about said resource consuming appliances when monitoring said measurement locations in said subset and said next measurement location.

16. The computer program product of claim 13, wherein said informative value comprises an unpredictability value, a variability consumption value, a total resource consumption value, a number of loads in communication with said measurement location, a number of connections to said measurement location, or combinations thereof.

17. A structure with sensors placed in a distributed network, comprising:
  said distributed network comprising a tree topology and being incorporated into said structure to supply said structure with a resource;
  a processor associated with the distributed network to receive input from measurement locations, wherein the processor is to process the input to determine an informative value based on the input;
  sensors placed in said distributed network at a subset of measurement locations located within said distributed network; and
  said sensors placed within said distributed network according to results of a mutual information function that selects measurement locations for sensor placement based on the informative value.

18. The structure of claim 17, wherein said mutual information function is represented as $$j^* = \underset{j \notin A}{\mathrm{argmax}} I(X_L; X_{A \cup j}) - I(X_L; X_A),$$

where j represents a next measurement location to be selected for said subset, A represents said subset of said measurement locations, L represents said measurement locations directly connected to resource consuming appliances, $I(X_L:X_A)$ represents an amount of information conveyed about said resource consuming appliances when monitoring said measurement locations within said subset, and $I(X_L:X_{A \cup j})$ represents an amount of information conveyed about said resource consuming appliances when monitoring said measurement locations in said subset and said next measurement location.

19. The structure of claim 17, further comprising a processor programmed to identify measurement locations in said distributed network and to select said subset.

20. The structure of claim 17, wherein selected measurement locations maximize sensor ability to gather resource consumption information.

* * * * *